United States Patent [19]

Marling

[11] 4,204,308

[45] May 27, 1980

[54] SCREW EXTRACTING DEVICE

[76] Inventor: Douglas S. Marling, 2511 Elizabeth St., Janesville, Wis. 53545

[21] Appl. No.: 929,899

[22] Filed: Aug. 1, 1978

[51] Int. Cl.[2] ........................ B23P 19/02; B25B 13/50

[52] U.S. Cl. ........................ 29/426.5; 81/53.2

[58] Field of Search ........................ 81/53.2, 91 R, 113, 81/114; 254/18; 279/42, 43, 48, 50, 56, 57; 145/1 R, 50 R; 29/427

[56] References Cited

U.S. PATENT DOCUMENTS

| | | | |
|---|---|---|---|
| 1,116,532 | 11/1914 | Armstrong | 279/42 |
| 1,141,741 | 6/1915 | Wiseman | 145/52 |
| 2,750,821 | 6/1956 | Hilsinger | 81/53.2 |
| 3,735,650 | 5/1973 | Weng | 81/53.2 |
| 4,078,766 | 3/1978 | Saurwein | 254/18 |

*Primary Examiner*—James L. Jones, Jr.

*Attorney, Agent, or Firm*—Larson, Taylor and Hinds

[57] ABSTRACT

A screw extracting device is provided for removing screws which cannot be removed with an ordinary screwdriver. The device comprises an elongate rod, a handle located at one end of the rod, a plurality of gripping fingers located at the other end of the rod for gripping the screw to be extracted a sleeve, threaded for movement along the rod, for controlling contraction and expansion of said gripping fingers in accordance with the longitudinal position of said sleeve along the rod so as to provide gripping and release of the screw head. The fingers each include a tapered tip portion which permits the fingers to be driven into the surface surrounding the head of the screw to be extracted and gripping ridges or the like for providing firm gripping of the screw head. A method of using the device is also enclosed.

7 Claims, 6 Drawing Figures

SCREW EXTRACTING DEVICE

FIELD OF THE INVENTION

The present invention relates to a device and method for extracting "stripped" or deformed screws notwithstanding the state of the screw.

BACKGROUND OF THE INVENTION

In many instances, screws whose heads have been "stripped" or otherwise deformed or damaged cannot be extracted using a conventional screwdriver. Screws get into this state because of the improper use of tools, wear and the like, and removal of such screws generally presents a frustrating problem. In this regard, a particularly vexing situation is presented when the screw head has been driven in so as to be flush with, or lie below, the surface which the screw is screwed into. A number of techniques are used to extract stripped screws, these techniques generally involving "brute forcing" the screw through the use of heavy pliers or the like, or where applicable, digging out the screw using whatever tool is available. None of these techniques is particularly successful in practice and thus a need exists for a simple, easy to use tool which enables a screw to be extracted when the head is stripped or otherwise damaged and which can be used even where the screw head lies flush with, or below, the surface into which the screw extends.

SUMMARY OF THE INVENTION

In accordance with the invention, a screw extracting device is provided which possesses the desirable characteristics discussed above and overcomes the problems associated with prior art techniques for removing screws which cannot be removed with an ordinary screwdriver. The device of the invention is easy to use and is relatively simple to manufacture. Further, the screw extracting device is rugged in construction and removes screws in a highly effective, efficient manner even where the screw head lies flush with or below the working surface.

According to a preferred embodiment of the invention, a screw extracting device is provided which comprises an elongate rod member which is threaded along a portion of the length thereof; a handle located at one end of the rod member; a plurality of gripping fingers located at the other end of the rod member for gripping the screw to be extracted; a control sleeve, threaded for movement along the rod member, for controlling contraction and expansion of the gripping fingers in accordance with the longitudinal position of the said sleeve along the rod member so as to permit a screw to be gripped and released. The fingers each include a tapered tip portion which permits the fingers to be driven into the surface surrounding the head of the screw to be extracted and means located thereon for providing firm gripping of the screw head. These gripping means preferably comprise gripping ridges on fingers similar to those found on pliers. Advantageously, the tips of said fingers are of a chisel-like configuration to enable the fingers to be driven into the working surface in which the screw is imbedded so that the fingers can be brought into engagement with the head.

In a specific embodiment, three gripping fingers are disposed in equispaced relationship around a common longitudinal axis. The fingers are formed integrally with the rod member and are biased outwardly away from their common longitudinal axis. The sleeve is tubular and the outer surface of said sleeve is knurled to enhance gripping.

The invention also involves a method of extracting a screw head which is substantially flush with or lies below the surface into which the screw extends which utilizes a screw extracting device as described above. The method comprises applying a force to one end of the screw extracting device so as to drive the gripping fingers into the surface to a depth such that the fingers, when closed, will firmly engage the head of the screw; screwing the control sleeve down on the rod, i.e., towards the gripping fingers, so as to cause the gripping members to close about the head of the screw; and rotating the device to cause unscrewing of the screw.

Other features and advantages of the invention will be set forth in, or apparent from, in detailed description of a preferred embodiment found hereinbelow.

DESCRIPTION OF THE PREFERRED EMBODIMENTS

Figure 1:
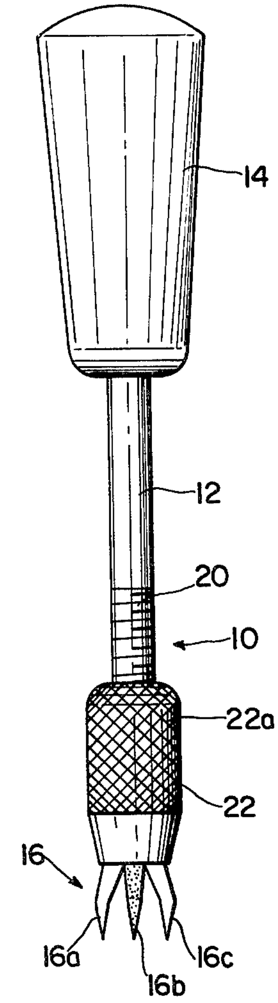
FIG. 1 is a side elevational view of a screw extracting device in accordance with a preferred embodiment of the invention.

Referring to FIG. 1, a preferred embodiment of the screw extracting device of the invention is illustrated. The device, which is generally denoted 10, includes a rod member 12 having a handle 14 attached to one end thereof. In an exemplary embodiment, rod 12 is fabricated of steel or a like metal while handle 14 is fabricated of wood or plastic.

Figure 2:
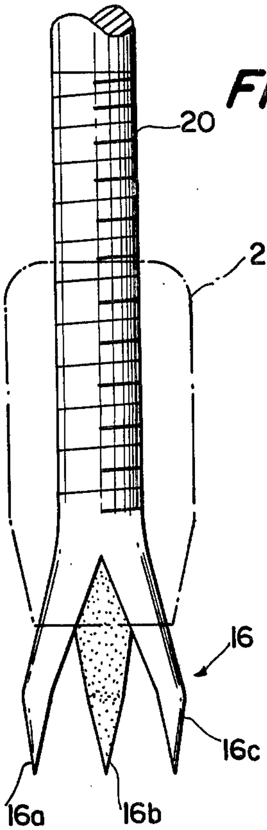
FIG. 2 is a detail, drawn to an enlarged scale and with the control sleeve shown in phantom, of the screw extracting device of FIG. 1.

As perhaps can be best seen in FIG. 2, the other end of rod 12 is formed to provide three gripping fingers **16*a*, 16*b* and 16*c*, which are collectively denoted 16. In a specific example, rod 12 is approximately 6 inches in length and ⅜ inch in diameter, and fingers 16 are formed by boring out the end of the rod 12 to a depth of approximately 1 and ¼ inches and a diameter of 3/16 inch. The fingers 16 then formed by splitting the bored out end of the rod 12. The fingers so formed are forced open, or outwardly, slightly so as to define a circle having diameter larger than the ⅜ inch outside diameter of rod 12. It will be appreciated that fingers 16 can take other forms and, for example, could be provided separately from rod 12** and pivotably connected to the end thereof. In this embodiment, a spring or the like would be utilized to bias the fingers outwardly. An example of a tool which utilizes such an arrangement is disclosed in U.S. Pat. No. 803,692 (Hill).

Figure 3:
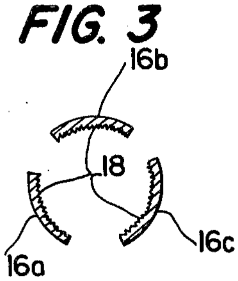
FIG. 3 is an end elevational, drawn to an enlarged scale, of the gripping fingers of the device of FIG. 1 illustrating the gripping surfaces.

The ends of fingers 16 are tapered in the manner of the end of a chisel, as illustrated, and the tip of each is provided with a plurality of ridges, indicated at 18 in FIG. 3 and similar to those found on a pair of pliers, to provide more secure gripping of the head of a screw. As indicated in cross section in FIG. 3, ridges 18 extend parallel to one another longitudinally of the fingers 16.

Rod member 12 is provided with screw threads 20 along the end thereof opposite handle 14 beginning at the base of fingers 16. A control sleeve 22 is threaded over this end of rod 12 for controlling opening and closing of gripping fingers 16. The inside diameter of sleeve 22 is nominally the same as the outside diameter of rod 12 and the threading of each is such that sleeve 22, when rotated, travels along the length of rod 12 in the manner of a traveling nut. The outer surface of sleeve 22 is knurled, as indicated at **22*a*, to provide improved gripping. Thus, by screwing sleeve 22 up and down along the length of rod 12, fingers 16** are progressively engaged and released so that they contract and expand.

Figure 4A:
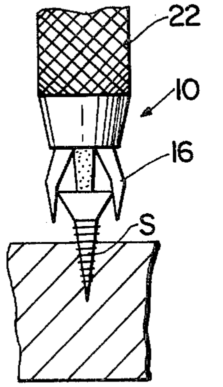
FIGS. 4(*a*), 4(*b*) and 4(*c*) illustrate the method of use of the screw extracting device of the invention for three different positions of the screw to be extracted.
Figure 4B:
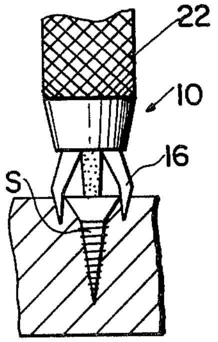
Figure 4C:
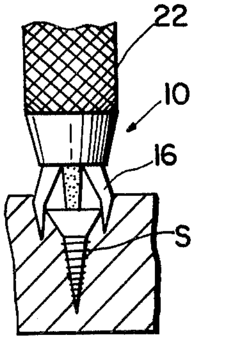

The operation of screw extracting device 10 will be considered in connection with FIGS. 4(*a*), 4(*b*) and 4(*c*). If the head of a screw becomes "stripped" so that the slot in the head normally engaged by a screwdriver is damaged or destroyed or if one is unable to remove the screw for any reason (such as the lack of an appropriate tool), the fingers 16 of screw extracting device 10 are placed over the head of the screw. Sleeve member 22 is then screwed down on rod 12 towards fingers 16 so as to cause fingers 16 to tighten around the head of the screw and firmly grip the same. After this is done, the screw is simply unscrewed by rotating device 10 using handle 12. FIG. 4(*a*) illustrates a situation wherein the head of a screw S extends above the surface in which the screw is embedded. The head is readily gripped by fingers 16 under these circumstances. In FIGS. 4(*b*) and 4(*c*), the screw head is flush with surface and below or beneath the surface, respectively. In this situation, the screw extracting device 10 is placed over the head of screw S and handle 14 is tapped so as to drive the tapered fingers 16 into the surface to such an extent that the ends of fingers 16 are able to grip the screw head. The fingers 16 are then tightened by means of sleeve 22 to firmly grip the screw head and the screw is then unscrewed.

Although the invention has been described relative to exemplary embodiments thereof, it will be understood that other variations and modifications can be effected in these embodiments without departing from the scope and spirit of the invention.

I claim:

1. A screw extracting device which is particularly adapted for removing screws which cannot be removed with an ordinary screwdriver, said device comprising:

an elongate rod member threaded along a portion of the length thereof;

a handle located at one end of said rod member;

a plurality of elongate, longitudinally extending gripping fingers located at the other end of said rod member for gripping the screw to be extracted, said gripping fingers being arranged so as to form a discontinuous annulus which surrounds the screw to be extracted; and a control sleeve means, threaded for movement along said rod member, for controlling expansion and contraction of said gripping fingers in accordance with the longitudinal position of said sleeve means along said rod member; said fingers each including a longitudinally tapered tip portion which permits the fingers to be driven into the surface surrounding the head of the screw to be extracted and including means for providing firm gripping of the screw head, said gripping means comprises a plurality of parallel extending gripping ridges formed on inwardly facing side surfaces of each of elongate fingers, said gripping ridges extending along the length of said fingers so as to permit said side surfaces to grip the screw over the area of mutual engagement between said surfaces and the screw.

2. A screw extracting device as claimed in claim 1 wherein said gripping means comprises gripping ridges on said fingers.

3. A screw extracting device as claimed in claim 1 wherein the tips of said fingers are of a chisel-like configuration.

4. A screw extracting device as claimed in claim 1 comprising three said gripping fingers disposed in equispaced relationship around a common longitudinal axis.

5. A screw extracting device as claimed in claim 4 wherein said fingers are formed integrally with said rod member and are biased outwardly away from said longitudinal axis.

6. A screw extracting device as claimed in claim 1 wherein said sleeve means comprises a tubular sleeve, the outer surface of said sleeve being knurled.

7. A method of extracting a screw the head of which is substantially flush with or lies below the surface into which the screw extends, utilizing a device comprising an elongate rod threaded along a portion of a length thereof; a handle located at one end of said rod; a plurality of elongate, longitudinally tapered gripping fingers located at the other end of said rod including a plurality of gripping ridges on inwardly facing side surfaces of each of said fingers along the length thereof for gripping the screw to be extracted; and a sleeve member, threaded for movement along said rod, for controlling opening and closing of said gripping fingers in accordance with the longitudinal position of said sleeve member along said rod, said method comprising:

applying an impact force to the said one end of said device so as to drive said elongate, longitudinally tapered gripping fingers into said surface in a direction substantially perpendicular to said surface and to a depth such that ridges on said inwardly facing side surfaces of said fingers, will engage the screw when said fingers are closed;

screwing said sleeve member onto said rod in a direction towards said gripping fingers so as to provide closing of said gripping fingers about the head of the screw; and rotating said device to cause unscrewing of the screw.

* * * * *